United States Patent [19]
Gavan

[11] Patent Number: 5,777,754
[45] Date of Patent: Jul. 7, 1998

[54] INTELLIGENT NETWORK-BASED STORE AND FORWARD FAX SYSTEM

[75] Inventor: John Charles Gavan, Colorado Springs, Colo.

[73] Assignee: MCI Communications Corporation, Washington, D.C.

[21] Appl. No.: 669,257

[22] Filed: Jun. 21, 1996

[51] Int. Cl.[6] .................................................. H04N 1/32
[52] U.S. Cl. .................... 358/407; 358/440; 379/93.24
[58] Field of Search ........................... 358/407, 434–436, 358/442, 468, 402, 439–440; 379/100.08, 93.09, 93.24; 395/834; 375/222; H04N 1/32

[56] References Cited

U.S. PATENT DOCUMENTS

| | | | |
|---|---|---|---|
| 5,452,099 | 9/1995 | Von Meister | 358/407 |
| 5,608,786 | 3/1997 | Gordon . | |
| 5,619,725 | 4/1997 | Gordon | 358/438 |

*Primary Examiner*—Kim Yen Yu

[57] ABSTRACT

An intelligent services network platform (ISN) of a telephone carrier network is equipped with a fax store and forward system (FSFS) capable of relaying fax transmissions between a customer's fax machine and an international destination. An autodialer associated with the fax machine automatically dials an 800 number designating the FSFS. It also automatically dials the preselected destination number and concurrently transmits an identification of the transmitting fax machine. An automatic call distributor in the ISN responds to the 800 number and transfers the fax transmission to an automated response unit which validates the customer's call. Thereafter, The FSFS is enabled to communicate directly with the sending fax machine to receive and store the transmitted fax. The FSFS will subsequently relay the fax transmission, even if repeated attempts are necessary, to the international destination through a bridging switch in the ISN and an international gateway switch connected to the network, external of the ISN. The FSFS generates confirmations for the customer and billing data.

8 Claims, 4 Drawing Sheets

| | |
|---|---|
| ACD | Automatic Call Distributor |
| ANI | Automatic Number Identification |
| ART | Automated Response Unit |
| BDR | Billing Data Record |
| FSFS | Fax Store and Forward Service |
| ISN | Intelligent Services Network |
| PC | Personal Computer |
| SAFF | Store and Forward Facility |
| WAN | Wide Area Network |

FIG. 4

INTELLIGENT NETWORK-BASED STORE AND FORWARD FAX SYSTEM

FIELD OF THE INVENTION

The present invention relates to fax transmission systems and more particularly to a network service for storing and forwarding a fax transmission from a customer's fax machine to a foreign destination.

BACKGROUND OF THE INVENTION

Individuals wishing to fax documents to other locations customarily employ either a fax machine or a personal computer (PC) equipped with a modem and associated software for accomplishing fax transmission. A disadvantage of current systems becomes apparent when there are phone line problems, or the phone line at the remote destination is busy. Usually, fax machines or fax-equipped PCs make repeated attempts which reduces productivity.

In connection with international fax transmission, line problems become more prevalent due to the distances and lack of high "quality" connections to various parts of the world. Accordingly, it would be desirable if a fax transmission could be generated by a customer of network services, the network having the capability of storing the fax transmission and automatically completing its transmission to an intended destination, even if multiple attempts are necessary. This would free the customer's fax machine from the burden of managing retries. Such a service would be a particular advantage for customers transmitting faxes to international destinations.

U.S. Pat. Nos. 4,994,926 and 5,291,302, both of which were issued to Gordon et al., disclose a system and method for facilitating fax transmission utilizing one or more store and forward facilities, wherein a subscriber to the system delivers an outgoing fax message to the Store and Forward Facility with which it is associated. The Store and Forward Facility (SAFF) records the subscriber's fax message together with data as to originating fax machine and destination fax machine. The SAFF then delivers the fax message to the intended recipient machine, either directly or through another SAFF. If an initial attempt fails, the SAFF periodically retries.

In a preferred embodiment, a SAFF can service a broad geographical area. However, communications beyond a certain limited distance involve at least two SAFFs. This would be the case in the event a domestic subscriber intends to transmit a fax message to an international destination. The requirement for multiple SAFFs unduly complicates and slows down ultimate fax relaying.

BRIEF DESCRIPTION OF THE PRESENT INVENTION

The present invention is a computer-driven system, installed in an intelligent services network (ISN) platform of a telephone network, that implements a fax store and forward service facilitating fax message delivery to international destinations. The pre-subscribed network customer makes a single fax transmission to the network to deposit a fax message thereby freeing the customer's line. The system is capable of making multiple automated fax transmission attempts to an international destination if initial line problems or busy conditions are encountered. At the completion of a successful or ultimately unsuccessful transmission, the customer is notified by fax of the end result.

In order to utilize the present system, a customer must subscribe to the service and be given a special telephone number, such as an 800 number. This number is identified as being associated with enhanced fax services, and when received by the network, the call is transferred to an appropriate ISN. The ISN is equipped with an ACD (Automatic Call Distributor) which recognizes the incoming call as being a fax. An Automated Response Unit (ARU) collects data from the ACD that relates to customer identification and the termination number for the fax to be transmitted to. The ARU validates this information and completes the necessary communication handshaking to a Fax Store and Forward System (FSFS) which stores the fax object transmitted from the customer.

If necessary, repeated automated fax transmissions will occur from the FSFS, through a bridging switch, to the network. From the network, an international gateway switch completes the call to its intended international destination. Only upon successful completion of a call will a Billing Data Record (BDR) be completed and written to a database for billing the customer. The BDR is written from a server containing the database, through a token-ring WAN, to a mainframe computer. Confirmation notices are sent, via fax, to the initiating customer so that confirmation of successful or ultimately unsuccessful transmission can be completed.

The present invention includes a single FSFS for relaying a domestically originating fax message through an international gateway switch. The FSFS is connected to the MCI Network through a bridging switch where it is capable of detecting a virtual phone number (800 number) dialed by the originating fax machine. A Network Information Distribution System (NIDS) server associated with the FSFS contains a database with corresponding data fully identifying the origination of the 800 number for confirmation and billing purposes.

BRIEF DESCRIPTION OF THE FIGURES

The above-mentioned objects and advantages of the present invention will be more clearly understood when considered in conjunction with the accompanying drawings, in which:

FIG. 4 is a table of acronyms employed in the specification.

DETAILED DESCRIPTION OF THE INVENTION

Figure 1:
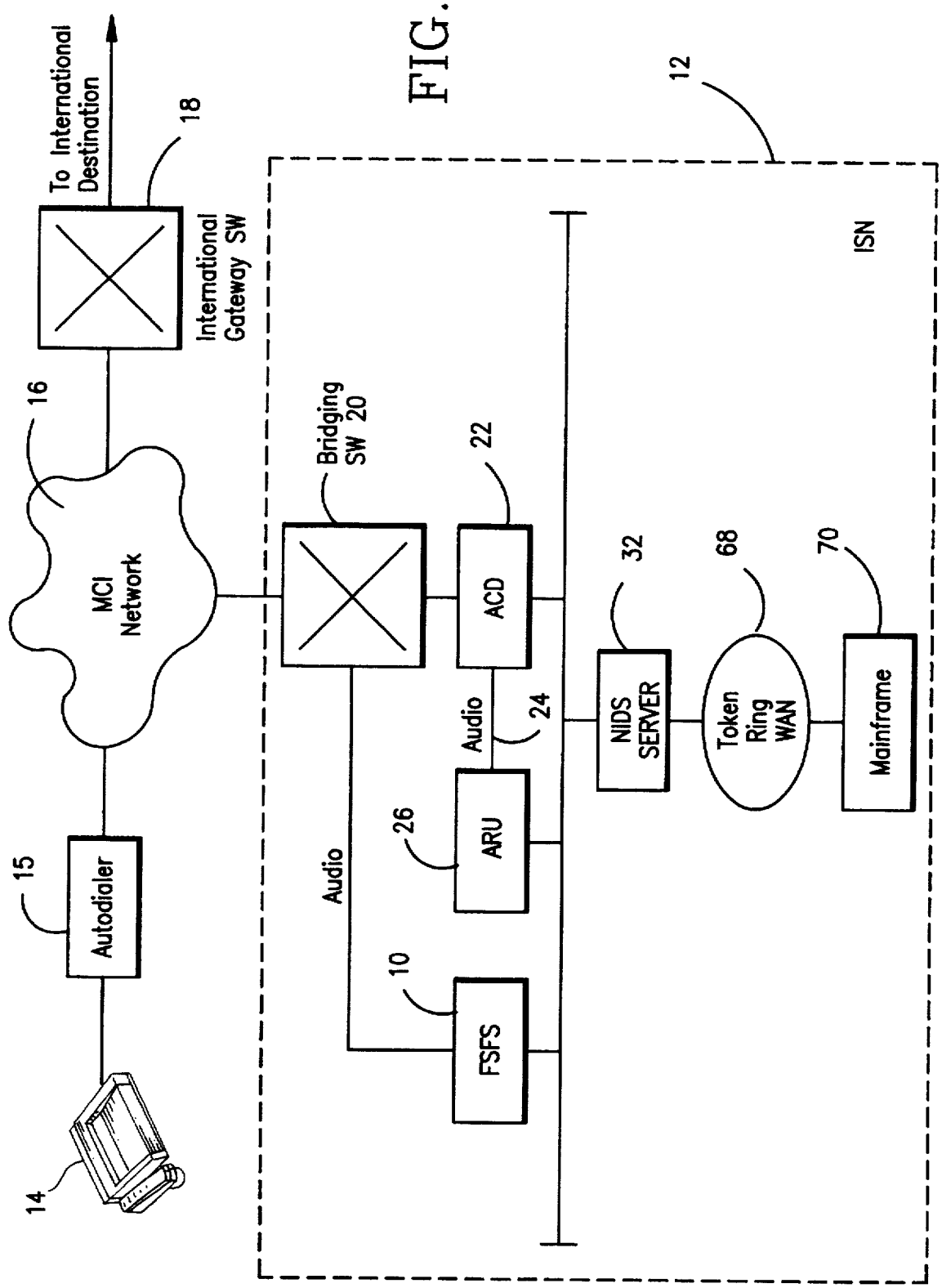
FIG. 1 is a block diagram of the present invention.

The diagrammatic system view of the present invention, shown in FIG. 1, indicates a pre-subscribed customer's fax machine 14 which originates a fax transmission intended for delivery to an international destination. The call is placed using a virtual number (800 number) through an autodialer 15. A telephone network, such as the MCI network 16, recognizes the call as being an 800 number call and relays the fax transmission to an Intelligent Services Network (ISN) 12. On the platform of this ISN is a Fax Store and Forward System (FSFS), which has, as its primary goal, the storing and forwarding of the fax transmission, even if multiple attempts are necessary due to busy signal or line problems to the international destination. The retry function of the FSFS is similar to that of the SAFF disclosed in previously discussed U.S. Pat. Nos. 4,994,926 and 5,291, 302 to Gordon et al. In a preferred embodiment of the present invention, the telephone subscriber is not charged for a fax transmission until the entire transmission is successfully relayed to an international destination via an international gateway switch 18, connected to the network 16.

The network is connected to the ISN 12 through a conventional bridging switch 20 which, in turn, bridges an incoming fax transmission to a conventional Automatic Call Distributor (ACD) which is a switching system designed to distribute a large volume of incoming calls to various facilities within the ISN. For purposes of convenience, the ISN 12 only has that portion indicated that is necessary for the Fax Store and Forward Service.

Thus, based on the 800 number dialed by the subscriber's fax machine, the ACD 22 queries the A Network Information Distribution System (NIDS) server 32, within the ISN platform, the server containing a database that correlates the 800 number with the FSFS platform.

The fax store and forward process begins with the conventional Automatic Response Unit (ARU) 26 which is incorporated within the ISN 12 and is responsive to the fax transmission, through the ACD 22.

Flow Diagram of ARU

Figure 2:
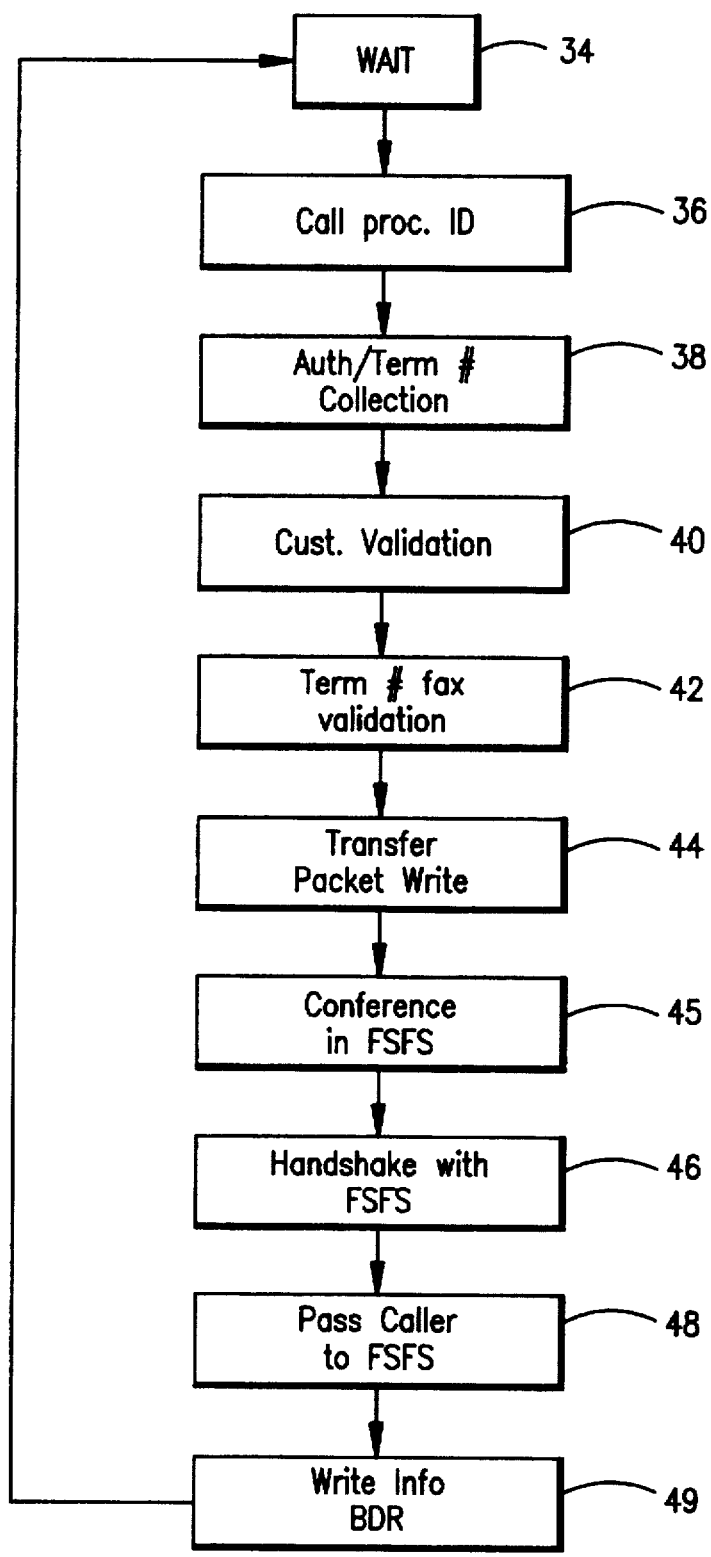
FIG. 2 is a flow diagram of an Automated Response Unit (ARU) explaining its operation in the present invention.

Referring to the flowchart of FIG. 2, the ARU waits for an incoming call during step 34. A call arrives when the ISN signals the ARU and an audio connection through the ACD is made simultaneously.

Next, the ARU identifies the 800 number generated by autodialer 15 at the subscriber station. The 800 access number is identified by the ARU as a call process initiated by autodialer 15 and relating to a fax to be handled by the FSFS. Specifically, the 800 autodialer access number is looked up in an 800 number translation file. If the 800 translation record is not loaded in the NIDS server database, the ARU disconnects the call and writes a non-billable Billing Detail Record (BDR). The next step carried out by the ARU is step 38 which achieves authorization code and termination fax number collection. The ARU expects to collect a string of DTMF digits containing an authorization code and international terminating fax number from the autodialer. To trigger the autodialer to send the tones, the ARU sends a trigger tone of specified frequency. If the caller's autodialer does not respond within a short period of time after receipt of the trigger tone, the ARU will resend the trigger tone. After a preselected number of retries, the ARU disconnects the call and writes a non-billable Billing Detail Record (BDR). If, on the other hand, the caller's autodialer does respond properly, a caller's authorization code and termination number is collected.

The next step in the process is the customer validation step 40. During this step, the authorization code collected from the autodialer is searched in the customer database in the NIDS server 32. If a record is found in the database, signifying authorization, the call proceeds. If not, the call is disconnected and a non-billable BDR is generated. The customer record will also include the billing automatic number identification (ANI), corresponding to the customer's telephone number, and this will access another record in the database containing information specific to the customer for billing purposes as well as limitations on the countries that may be called.

Step 42 follows, wherein a formal check is performed on the terminating international fax number. If the format is incorrect, the ARU plays an error script, disconnecting the call, and a non-billable BDR is prepared. The ARU checks the country code from the customer record stored in the NIDS server 32. If the terminating international fax number has been designated as a limitation for or by the customer, the ARU disconnects the call and prepares a non-billable BDR.

Once the call has been validated, the ARU is ready to connect the caller to the FSFS platform to collect the fax, as indicated for step 44. Initially, a NIDS transfer record is written to the NIDS server 32. This record contains information needed by the FSFS platform to process a call and write a billable BDR. This record is retrieved by the FSFS platform. Typically, the NIDS transfer records include the terminating number and billing information. If the ARU is unable to write this NIDS transfer record to the NIDS server, the call is disconnected and a non-billable BDR is generated. In step 45, the ARU places the call on hold and establishes a connection with the FSFS. At step 45, the FSFS will answer the call from the ARU. The ARU will be responsible for detecting answer supervision. The subsequent necessary handshaking between the FSFS and the ARU takes place to complete the communication between these two elements. Part of the handshaking operation confirms that the NIDS customer record has been successfully retrieved from the server 32.

As indicated in step 48, upon receiving acknowledgment tones from the FSFS, the ARU removes a caller from on hold at which point the FSFS, ARU and the caller's fax are back in conference momentarily in an audio connection through the bridging switch 20 (FIG. 1). The ARU releases the call, effectively dropping the call while leaving the customer connected to the FSFS. The ARU will then write a non-billable BDR. At this point, the FSFS sends a fax tone to the customer's fax machine.

Flow Diagram of FSFS

Figure 3:
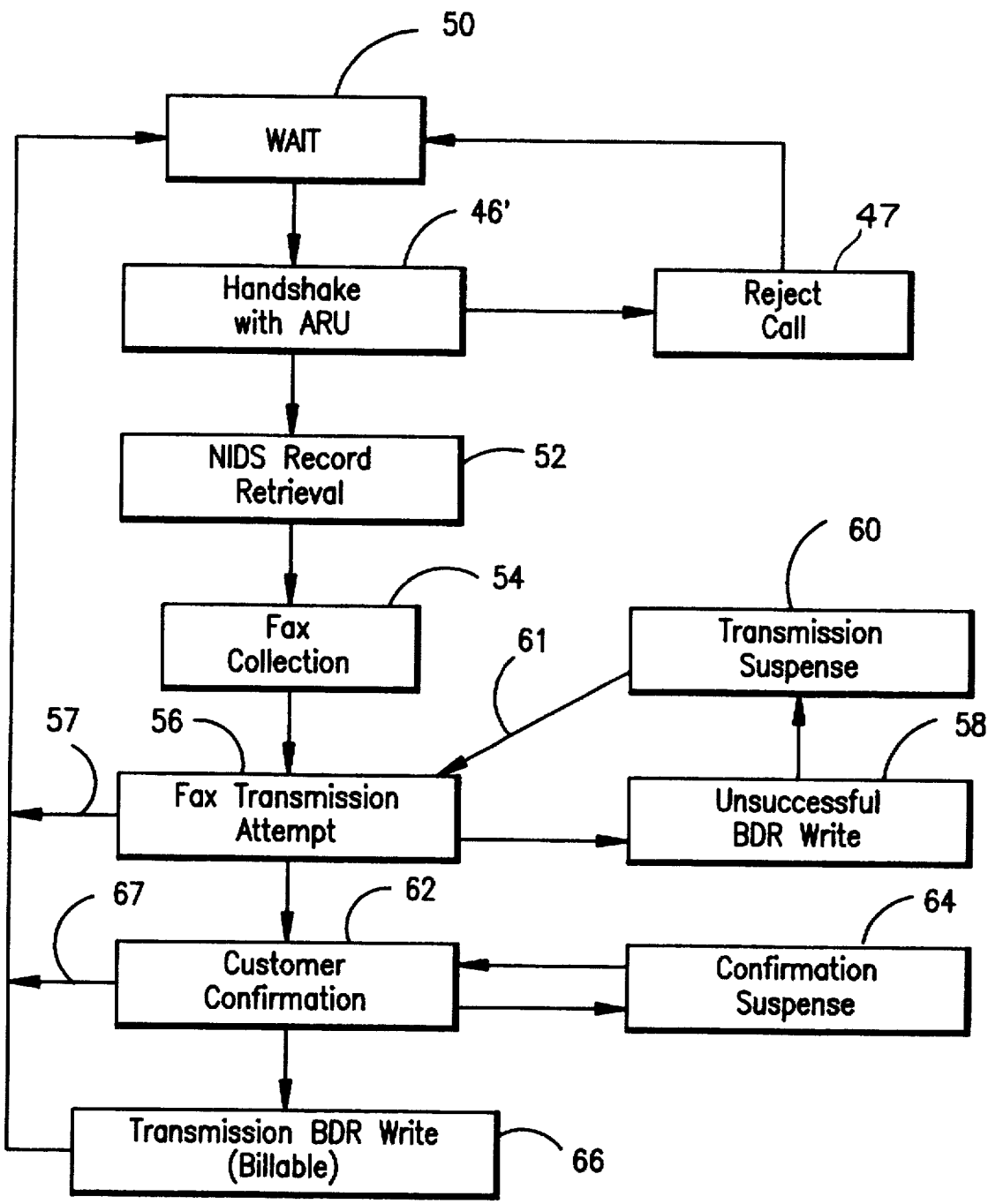
FIG. 3 is a flow diagram of a Fax Store and Forward System (FSFS) explaining its operation in the present invention.

The flow diagram, in connection with the FSFS, will be discussed in connection with FIG. 3. During step 50, the FSFS platform is waiting for an incoming call from the ARU. The succeeding step 46' accomplishes a handshake operation with the ARU, as previously described in step 46 of FIG. 2. If handshaking is unsuccessful, the FSFS rejects the call as indicated in FIG. 3. In step 52, the FSFS attempts to retrieve the NIDS customer record from the NIDS server. At this point in the call process, the ARU and FSFS are in audio communication. The FSFS cannot release the ARU until the transfer data packet of the customer record has been successfully retrieved. As indicated at step 54, once retrieved, the FSFS will DTMF dial the proper acknowledgment tones back through the ARU. Once the FSFS has sent an acknowledgment to the ARU and handshaking communication therebetween terminates, a fax tone is generated by the FSFS and the caller's fax machine starts sending its fax. The received fax transmission is stored in the FSFS in a fail safe message store.

Fax transmission is next quickly attempted by the FSFS, as indicated in step 56. This transmission is shown in FIG. 1 to include the audio path between the FSFS, bridging switch 20, the MCI network 16 and international gateway switch 18. If the attempt is unsuccessful, a non-billable BDR is generated, as indicated by step 58 and fax transmission is suspended, as indicated by step 60 in FIG. 3. Transmission will be attempted at preselected intervals based on the invocation of an intelligent retry algorithm for a preselected number of times as shown by return path 61, 56, 57 and 50. Each outbound attempt requires the FSFS to create a BDR, either billable or non-billable. If a fax is partially transmitted, the FSFS will send an appropriate cover sheet indicating that the pages reproduced result from a resumed transmission.

Step 62 relates to customer confirmation wherein the customer is sent a return fax indicating the final disposition of the fax transmission. These may include messages that the fax was properly sent or improperly sent, and identifies the time and terminating phone number. If delivery of the confirmation notice to the customer is initially unsuccessful, several attempts will be made to accommodate customer line conditions, such as a busy signal. This is indicated by step 64 in FIG. 3. If, after a preselected number of attempts, confirmation to the customer cannot be completed, the process is returned, via path 67, to the wait step 50.

Whether or not confirmation to the customer is completed, once the fax has been successfully transmitted to the international destination, the FSFS must create a billable BDR. This is indicated by step 66 in FIG. 3. The BDR is written to the NIDS server 32 and then to a mainframe computer 70, within the ISN 12, via a token ring Wide Area Network (WAN). The mainframe computer 70 includes an appropriate database for tracking billing of the fax services as well as for fraud control monitoring.

Although the previous discussion emphasizes the use of a fax machine, the system may accommodate customers who use fax board-equipped computers.

It should be understood that the invention is not limited to the exact details of construction shown and described herein for obvious modifications will occur to persons skilled in the art.

I claim:

1. A fax store and forward system (FSFS) installed in a telephone network and comprising:

an autodialer connected to a customer's fax for calling an intelligent services network (ISN), connected to the telephone network, and in which the FSFS is located, the autodialer calling the ISN via a preselected stored 800 number and further providing customer information and the international destination number;

the ISN including (a) a bridging switch for connecting the ISN to the telephone network when the autodialer places a call to the ISN;

(b) an automatic call distributor (ACD) for responding to the 800 number called and connecting an incoming fax message from the customer to an automated response unit (ARU) for completing communicating handshaking with the customer's fax machine;

(c) the FSFS connected to the ARU and controlled by the ARU, the FSFS also connected by a bi-directional switched telephone line to the bridging switch, once the handshaking is successfully completed, for receiving and storing the customer's fax message;

(d) a domestic and international switched telephone network transporting the customer's fax message to the international destination with a preselected number of delivery attempts provided by the FSFS, if necessary, until complete transmission is successful;

(e) a network information distribution system (NIDS) server for transferring preselected customer record data, from a database, to the FSFS, necessary to complete store and forward fax transmission to the international destination, and storing a billing data record (BDR) upon completion of the transmission.

2. The facility set forth in claim 1 further comprising:

computer means located at the ISN and connected to the NIDS server for receiving and storing the BDR for customer billing.

3. The facility set forth in claim 1 further comprising an international gateway switch connected to the telephone network for connecting the store and forward fax transmission to the international destination, via the telephone network and the bridging switch.

4. A method for relaying fax transmission from a customer's fax machine to an international destination comprising the steps:

locating a fax store and forward system (FSFS) at the site of an intelligent services network (ISN);

in response to a customer's entry, autodialing the ISN via a preselected stored 800 number that further provides customer information and the international destination number;

connecting the ISN to the telephone network when the autodialer places a call to the ISN;

subjecting an automatic call distributor (ACD) to the 800 number called for responding to it and connecting an incoming call from the customer to an automated response unit (ARU) that completes communication handshaking with the customer's fax machine;

the ARU connecting the FSFS to the bridging switch, over a bi-directional telephone line, once the handshaking is successfully completed, for receiving and storing the customer's fax message;

the telephone network and FSFS subsequently relaying the stored customer's fax message to the international destination for a preselected number of attempts, if necessary, until complete transmission is successful;

transferring preselected customer record data to the FSFS from a network information distribution system (NIDS) server, the data being necessary to complete store and forward fax transmission to the international destination; and storing a billing data record (BDR) upon compilation of the transmission to the terminating international destination.

5. The method set forth in claim 4 further comprising the step of connecting a computer to the NIDS server for receiving and storing the BDR for subsequent customer billing and fraud control.

6. The method set forth in claim 4 further comprising the step of connecting an international gateway switch to the telephone network for connecting the store and forward fax transmission to the international destination, via the telephone network and the bridging switch.

7. A method for relaying fax transmission from a customer's fax machine to an international destination comprising the steps:

locating a fax forward and store system (FSFS) at the site of an intelligent services network (ISN) of a telephony carrier's telephone network;

in response to a customer's entry, autodialing the ISN via a preselected stored 800 number that further provides customer information and the international destination number;

identifying an autodialed call at the ISN as a fax transmission from a customer;

triggering the autodialer to transmit a customer authorization code and an international destination phone number;

validating the customer authorization code;

transferring, to a database located at the site of the ISN, the international destination number and billing information;

causing the FSFS to accept data regarding the customer as well as the international destination number from the database;

switching the FSFS into communication with the customer's fax machine, via a bridging switch and the telephone network;

collecting a fax transmission from the customer in the FSFS for storage;

attempting to subsequently send the fax transmission to the international destination via the bridging switch, telephone network, and an international gateway switch;

retrying, if necessary, for a preselected number of times, to resend the relayed fax transmission in the event of prior failure;

confirming for the customer the eventual disposition of the relayed fax transmission; and transmitting a billable billing data record to a billing database only upon successful completion of an entire relayed fax transmission.

8. The method set forth in claim 7 and further comprising the steps of making multiple attempts, if necessary, at confirming for the customer the eventual disposition of the store and forward fax transmission; and terminating such attempts after a preselected number of attempts.

\* \* \* \* \*